June 20, 1933. F. E. DOUGLAS 1,914,663
THREAD CUTTING TEMPLE FOR LOOMS
Filed July 29, 1932 2 Sheets-Sheet 2

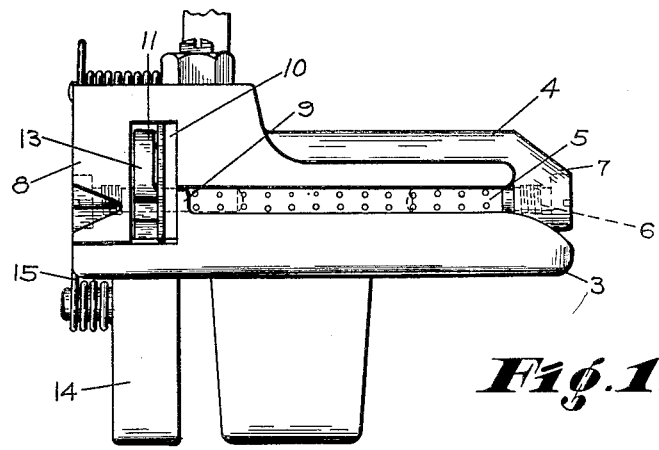
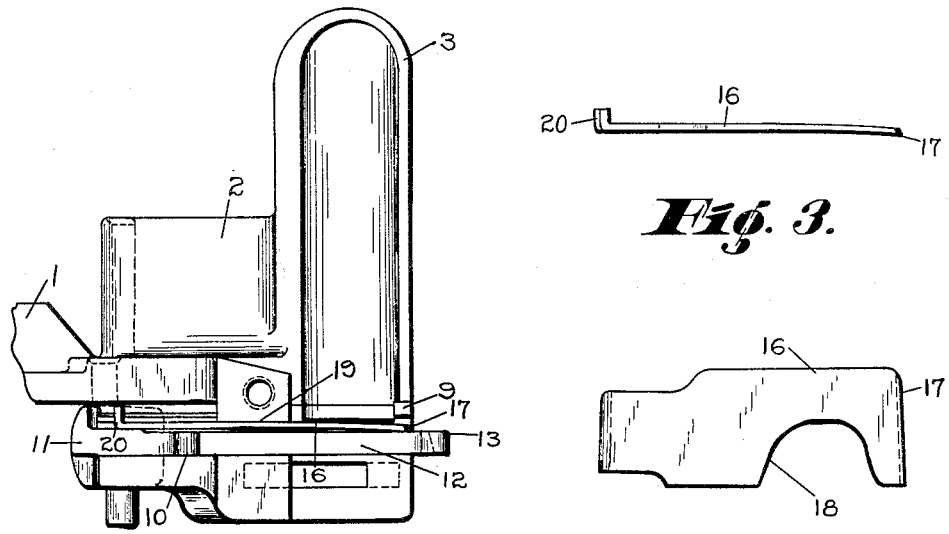

WITNESS.
CLINTON S. COBURN.

INVENTOR.
FREDRIC E. DOUGLAS.
BY Claude F. Snider
ATTORNEY.

Patented June 20, 1933

1,914,663

UNITED STATES PATENT OFFICE

FREDRIC E. DOUGLAS, OF HOPEDALE, MASSACHUSETTS, ASSIGNOR TO DRAPER CORPORATION, OF HOPEDALE, MASSACHUSETTS, A CORPORATION OF MAINE

THREAD CUTTING TEMPLE FOR LOOMS

Application filed July 29, 1932. Serial No. 625,763.

The present invention relates to thread cutting temples for looms, and has more particular reference to the thread cutting mechanism therein.

In the conventional form of thread cutting temple the cutting mechanism is mounted in a guideway in the temple head immediately adjacent the end of temple roll, and is comprised of a stationary or ledger blade and a movable cutter blade, which latter is frequently freely mounted in the guideway for rocking and sliding movements imparted from the lay. However, regardless of the type of blade used, it has been a source of great annoyance and trouble to keep the movable blade and the ledger blade in the constant shearing contact necessary to insure proper operation of the mechanism.

It has occurred to me that instead of providing springs to urge the relatively heavy movable blade into contact with the ledger blade or providing unduly complex forms of mechanism to procure the desired shearing relation between the blades, the same result could be procured in a much simpler and more satisfactory manner by proper modification of the ledger blade.

Accordingly, it is the principal object of my invention to provide, in a thread cutting temple, a cutting mechanism comprised of a movable cutter blade and a ledger blade mounted in a guideway in the temple head, wherein the ledger blade is of such form and construction as to insure proper shearing contact with the movable cutter member at all times.

A further object is to provide such mechanism which shall be relatively inexpensive to manufacture and which shall, nevertheless, retain its effectiveness over long periods of time with little or no attention or adjustment.

Further objects of my invention will, in part, be hereinafter more specifically enumerated and will, in part, become obvious as the description proceeds.

Referring to the drawings, which illustrate some of the desirable forms of my invention:

Fig. 1 is an end elevation of a temple carrying a thread cutting mechanism constructed in accordance with my invention;

Fig. 2 is a fragmentary plan view of the temple shown in Fig. 1 with the temple cap and other parts omitted to more clearly show the thread cutting mechanism;

Figs. 3 and 4 are details of the ledger blade appearing in Figs. 1 and 2;

Figure 6:
Figs. 6 and 7 are details of the ledger blade appearing in Fig. 5.

The particular thread cutting temple illustrated includes a bar 1 adapted to be yieldingly mounted in a housing on the breast beam of a loom (not shown) and carrying at its rearward end a head 2. The temple head 2 may, as is usual, include a pod 3 and cap 4 housing one or more pin-studded rolls for gripping and guiding the fabric as it is woven, the particular temple shown having but a single roll 5 journalled on a roll-pin 6 which extends through the inner end 7 of the cap and is threaded into the outer end wall 8 thereof. The pod 3 is provided with an upturned lip or guide 9 for limiting the outward movement of the selvage of the cloth and the thread cutting mechanism is accordingly placed closely adjacent the lip 9, in a guideway 10. This guideway is, as shown, preferably positioned substantially vertically and extends longitudinally of the temple head entirely through the same.

The thread cutting mechanism consists of a movable cutter blade, and a stationary ledger blade positioned in the guideway, and a suitable spring for urging the movable blade to its normal rearward position.

The movable cutter member 11, Figs. 1, 2, 5 and 8, is of the well known rockable and slidable type and consists of a body portion 12 provided at its rearward end with a depending cutting tip 13, and at its forward end with a depending heel 14 adapted to be struck by a bunter on the lay, not shown. This particular part of the cutting mechanism is not, per se, of my invention, reference being had to Patent No. 1,366,034 granted January 18, 1921, and Patent No. 1,838,588 granted Dec. 29, 1931, for examples of suitable prior art constructions which may be used if so desired.

The spring 15, Fig. 1, for urging the movable cutter member 11 rearwardly, may be identical with that shown in Stimpson Patent 1,692,942 granted Dec. 4, 1928, this spring forming no part of the present invention.

My invention is more particularly concerned with a novel form of ledger blade, which cooperates with the guideway and the movable cutter member in a novel and improved manner.

Referring more particularly to Figs. 1, 2, 3 and 4, the guideway 10 is slightly wider, axially of roll 5, than the thickness of body portion 12 of the movable cutter member, thus allowing the ledger blade 16 to be positioned in the guideway alongside the movable member 11. The ledger blade 16 is comprised of a substantially flat piece of spring steel, bowed slightly between its ends as clearly shown in Figs. 2 and 3, and having its rearward vertical edge sharpened as at 17 for cooperation with the cutting edge of tip 13 on the movable member 11. A recess 18 extends upwardly from the lower end of the ledger blade adjacent its sharpened end, in order to clear the temple roll pin 7.

The ledger blade is but loosely positioned in the guideway, substantially parallel to the plane of movement of the member 11, and is substantially co-extensive in length with the guideway. By the term "loosely" I mean that, while the blade contacts member 11 at each end and contacts the inner wall of the guideway, as at 19, intermediate its ends, it is not rigidly bolted or riveted to the wall of the guideway. Therefore, the rearward cutting edge 17 of the ledger blade is biased into shearing relation with the cutting edge of the tip 13 and such bias is due entirely to the inherent resiliency of the ledger blade itself, thus eliminating any necessity for external means for holding the two cutting edges in operative relation.

The great length of the ledger blade, as compared with the length of the usual prior art blades, is of considerable importance, principally because it permits the maintenance of a very light pressure against the movable cutter member which pressure will not vary, under varying operating conditions, beyond the limits necessary to proper shearing relation between the cutting edges. A further decided advantage of the particular construction lies in the fact that since the entire rearward end of the ledger blade is biased toward the movable cutter member, the pressure between the two cutting edges will be substantially uniform from top to bottom of the vertical edge 17, thus insuring that the thread will be cut, regardless of where, along the vertical edge 17, it may happen to be positioned.

Since the ledger blade is but loosely positioned in the guideway, the ledger blade and temple head must be provided with suitable cooperating means for preventing forward and rearward displacement of the ledger blade. To this end I have devised various simple but effective holding means which may be used, or other forms may readily be devised. In Figs. 2, 3 and 4, a laterally projecting lug 20 is provided on the front end of the ledger blade, for cooperation with a corresponding recess formed in the contiguous wall of the guideway 10.

Figure 5:
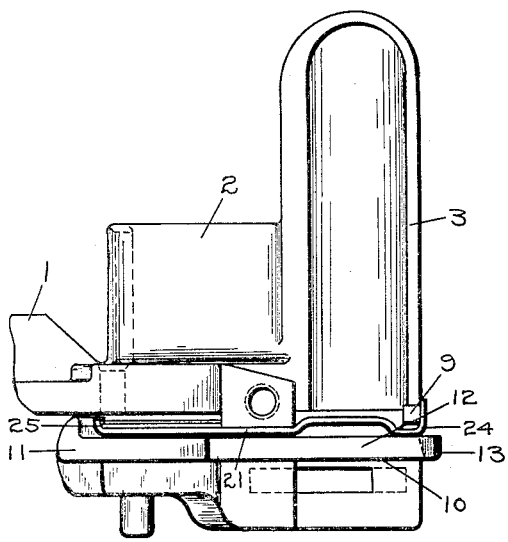
Fig. 5 is a view similar to Fig. 2 but showing a modified form of ledger blade.
Figure 7:
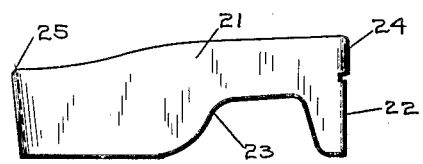

In the form shown in Figs. 5, 6 and 7, the ledger blade 21 is provided at its rearward end with a vertical sharpened cutting edge 22 and is also provided with an upwardly extending temple-roll-pin-clearing recess 23 as in the blade 16. However, in this form, the bowed portion of the blade is confined to the relatively narrowed portion in the region of the recess 23. This blade may be made of relatively heavy stock, and the confining of the spring action to the narrow portion of the blade will prevent the exertion of unduly heavy pressure against the movable cutter member. Also, in this form, a laterally extending lug 24 is formed at the rearward end of the blade above the cutting edge 22, and a similar lug 25 is formed at the forward end of the blade. The lugs 25 and 24 cooperate, respectively, with the front and rear faces of the temple head, being spaced apart just sufficiently to prevent forward and rearward displacement of the ledger blade without interfering with the free spring action of the rearward end of the latter.

Figure 9:
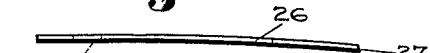
Figs. 9 and 10 are details of the ledger blade appearing in Fig. 8.
Figure 8:
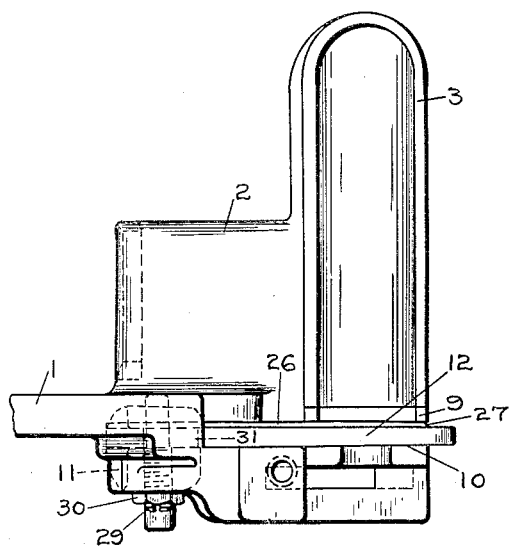
Fig. 8 is a view similar to Figs. 2 and 5 but showing a third form of ledger blade.
Figure 10:
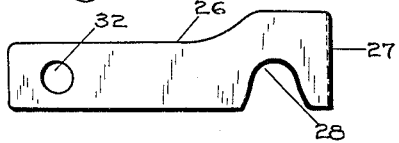

In the form shown in Figs. 8, 9 and 10, the ledger blade 26 is bowed from end to end, and is provided with a vertical cutting edge 27 and a temple-roll-pin-clearing recess 28, but does not have any laterally extending lugs. The ledger blade 26 is confined against forward and rearward movement by a pin, or screw, 29 threaded into the outer wall of the temple head and held in place by a check nut 30. This pin passes through an elongated slot 31 in the movable cutter member, and likewise through an aperture 32 in the ledger blade. This blade is cheaper in replacement costs than the other forms, but the initial cost of the temple is slightly higher.

Figure 11:
Figs. 11 and 12 are details of a fourth form of ledger blade that may be used if desired.
Figure 12:
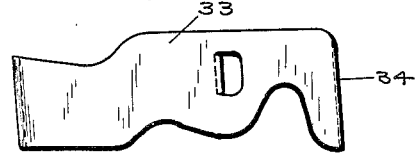

The ledger blade 33 shown in Figs. 11 and 12 is provided with a slightly inclined cutting edge 34 at its rearward end, and is also provided with a laterally extending lug 35 at its front end and a similar punched-out lug intermediate its ends for cooperation, respectively, with the front face of the temple head and a face on the temple cap. This form, and the form shown in Figs. 5, 6 and

I claim as my invention:

1. A thread cutting temple for looms, comprising a temple head having a guideway therein extending longitudinally of the temple in a vertical plane, a rockable and slidable cutter member positioned in said guideway and having at its rearward end a depending cutting portion, and a stationary ledger blade loosely positioned in and substantially parallel to the said guideway, the rearward end of said ledger blade being provided with a cutting edge and being also biased into shearing contact with the said cutting portion of the movable cutter member, the said ledger blade and temple head being provided with cooperating means preventing forward and rearward displacement of the ledger blade.

2. A thread cutting temple for looms, comprising a temple head having a guideway therein extending longitudinally of the temple in a vertical plane, a rockable and slidable cutter member positioned in said guideway and having at its rearward end a depending cutting portion, and a stationary ledger blade loosely positioned in and substantially parallel to the said guideway beside the said movable cutter member, the rearward end of said ledger blade being provided with a cutting edge and being biased toward the said cutting portion of the movable cutter member, the said ledger blade and temple head being provided one with an opening and the other with a cooperating lug for preventing forward and rearward displacement of the ledger blade.

3. A thread cutting temple for looms, comprising a temple head having a guideway therein extending longitudinally of the temple in a vertical plane, a rockable and slidable cutter member positioned in said guideway and having at its rearward end a depending cutting portion, and a stationary ledger blade loosely positioned in and substantially parallel to the said guideway, the rearward end of said ledger blade being provided with a cutting edge and being biased toward the said cutting portion of the movable cutter member, the said ledger blade and temple head being provided respectively with an opening and a cooperating pin for preventing forward and rearward displacement of the ledger blade, the said pin passing through the said opening and through an elongated aperture in the said movable cutter member and being secured in the temple head at the forward end of said guideway.

4. A thread cutting temple for loom, comprising a temple head having a guideway therein extending longitudinally of the temple in a vertical plane, a rockable and slidable cutter member positioned in said guideway and having at its rearward end a depending cutting portion, and a stationary ledger blade loosely positioned in and substantially parallel to the said guideway, the rearward end of said ledger blade being provided with a cutting edge and being biased toward the said cutting portion of the movable cutter member, the said ledger blade and temple head being provided respectively with a laterally projecting lug and a cooperating slot for preventing forward and rearward displacement of the ledger blade.

5. A thread cutting temple for looms, comprising a temple head having a guideway therein extending longitudinally of the temple in a vertical plane, a rockable and slidable cutter member positioned in said guideway and having at its rearward end a depending cutting portion, and a stationary ledger blade loosely positioned in and substantially parallel to the said guideway, the rearward end of said ledger blade being provided with a cutting edge and being biased toward the said cutting portion of the movable cutting member, the said ledger blade being provided with a laterally projecting lug at its rearward end cooperating with the rear face of the temple head and another similar lug at its forward end cooperating with the front face of the temple head to prevent forward and rearward displacement of the ledger blade.

6. As an article of manufacture, a ledger blade for thread cutting loom temples, said ledger blade being comprised of a substantially flat piece of spring steel of appreciably greater length than width and being sharpened at its rearward end to provide a vertical cutting edge, the said piece having a temple-roll-pin-clearing recess extending upwardly from its lower edge adjacent the said sharpened end, the said piece being bowed slightly intermediate its ends in a direction transverse to the said cutting edge, and being provided, at one end at least, with a laterally extending holding lug.

FREDRIC E. DOUGLAS.